(12) United States Patent
Noh et al.

(10) Patent No.: US 10,468,895 B2
(45) Date of Patent: Nov. 5, 2019

(54) CHARGER WITH IMPROVED HEAT RADIATION AND THE MANUFACTURING METHOD THEREOF

(71) Applicant: SOLUM CO., LTD., Suwon-si (KR)

(72) Inventors: Young-seung Noh, Suwon-si (KR); Hyun-su Kim, Suwon-si (KR); Soon-joung Yio, Suwon-si (KR); Young-joo Kim, Suwon-si (KR); Jun-kyu Lee, Suwon-si (KR)

(73) Assignee: SOLUM CO., LTD., Suwon-si (KR)

( * ) Notice: Subject to any disclaimer, the term of this patent is extended or adjusted under 35 U.S.C. 154(b) by 575 days.

(21) Appl. No.: 15/168,427

(22) Filed: May 31, 2016

(65) Prior Publication Data

US 2016/0352119 A1 Dec. 1, 2016

(30) Foreign Application Priority Data

May 28, 2015 (KR) .......................... 10-2015-0075275
Sep. 22, 2015 (KR) .......................... 10-2015-0134144

(51) Int. Cl.
*H02J 7/00* (2006.01)
(52) U.S. Cl.
CPC .......... *H02J 7/0045* (2013.01); *H02J 7/0052* (2013.01); *H02J 2007/0062* (2013.01)
(58) Field of Classification Search
CPC ................................................... H02J 7/0045
USPC ....................................................... 320/107
See application file for complete search history.

(56) References Cited

U.S. PATENT DOCUMENTS

| 5,176,300 | A | * | 1/1993 | Kishikawa | B29C 65/08 220/265 |
|---|---|---|---|---|---|
| 6,396,190 | B1 | * | 5/2002 | Ahn | D06F 37/304 310/429 |
| 2006/0274505 | A1 | * | 12/2006 | Yeh | G11B 33/124 361/704 |
| 2012/0125571 | A1 | * | 5/2012 | Lutz | B64G 1/503 165/104.21 |
| 2013/0307464 | A1 | * | 11/2013 | Zhu | H02J 7/0055 320/101 |
| 2013/0314964 | A1 | * | 11/2013 | Yoshikawa | H01F 37/00 363/131 |

(Continued)

FOREIGN PATENT DOCUMENTS

CN 204179715 U * 2/2015 ............... H02J 7/00

*Primary Examiner* — Jerry D Robbins
(74) *Attorney, Agent, or Firm* — Sughrue Mion, PLLC

(57) ABSTRACT

Provided herein is a charger with improved radiation function capable of lowering its surface temperature to prevent the surface temperature from increasing excessively, the charger according to one aspect of the present disclosure including a printed circuit board on which circuit elements are mounted; an inner case formed in a hollow case shape of which both surfaces are open, and where the printed circuit board is arranged inside; a radiation member formed to cover an outer surface of the inner case to release heat generated in the circuit elements of the printed circuit board; an outer case formed to encompass the radiation member and provided with one open surface; a cover assembled in the outer case and configured to close the one open surface of the outer case; and a terminal coupled to one surface of the outer case, and configured to enable electricity to be supplied to the charger when inserted into a consent.

14 Claims, 31 Drawing Sheets

(56) References Cited

U.S. PATENT DOCUMENTS

| | | | |
|---|---|---|---|
| 2014/0313806 A1* | 10/2014 | Shinohara | H05K 7/20927 363/141 |
| 2014/0375269 A1* | 12/2014 | Ogura | H02J 7/0026 320/112 |
| 2015/0123598 A1* | 5/2015 | Tew | H02J 7/0042 320/107 |
| 2017/0321850 A1* | 11/2017 | Chien | F21V 29/20 |

* cited by examiner

CHARGER WITH IMPROVED HEAT RADIATION AND THE MANUFACTURING METHOD THEREOF

CROSS-REFERENCE TO RELATED APPLICATIONS

This application claims priority from Korean Patent Applications No. 10-2015-0075275, and No. 10-2015-0134144, filed on May 28, 2015, and Sep. 22, 2015, respectively, in the Korean Intellectual Property Office, the disclosure of which is incorporated herein by reference in its entirety.

BACKGROUND OF THE INVENTION

Field of the Invention

Apparatuses and methods consistent with the present disclosure relate to a charger, and more particularly, to a charger for charging a mobile device.

Description of the Related Art

As specifications of mobile devices become more and more advanced in recent days, power consumption is increasing, and thus batteries that are an electrical power source are becoming increasingly massive in capacity. Since the time it takes to charge a battery is proportionate to the capacity of the battery, it now takes more time to charge a battery than it used to. Therefore, methods are being sought to reduce the charging time for the sake of users' convenience, and a method of increasing the output power of the charger is one of them.

However, when the output power of a charger is increased, more heat will be generated from internal circuit components proportionately, thereby increasing the surface temperature of the charger. This may result in low temperature burns. Therefore, a technique for lowering the temperature of the surface of the charger and maintaining it below a certain level is required.

SUMMARY OF THE INVENTION

A purpose of the present disclosure is to provide a charger with improved radiation function of a structure for lowering its surface temperature and preventing the surface temperature from increasing excessively.

According to an aspect of the present disclosure, there is provided a charger with improved radiation function, the charger including a printed circuit board where circuit elements are mounted; an inner case formed in a hollow case shape of which both surfaces are open, and where the printed circuit board is arranged inside; a radiation member formed to cover an outer surface of the inner case to release heat generated in the circuit elements of the printed circuit board; an outer case formed to encompass the radiation member, and provided with one open surface; a cover assembled in the outer case, and configured to close the one open surface of the outer case; and a terminal coupled to one surface of the outer case, and configured to enable electricity to be supplied to the charger when inserted into a consent.

According to another aspect of the present disclosure, the inner case and the outer case may be made of different insulating materials from each other.

According to another aspect of the present disclosure a cover portion radiation member may be arranged inside the cover.

According to another aspect of the present disclosure, a plurality of coupling holes may be formed on at least one surface of the radiation member, and a plurality of projections to be coupled to the coupling holes may be formed on one of the inner case and the outer case.

According to another aspect of the present disclosure, each of the plurality of projections may pass the coupling hole and protrude towards outside of the radiation member, and a hook may be formed at a distal end of each of the projections.

According to another aspect of the present disclosure, the radiation member may be integrally formed with at least one of the inner case and the outer case.

According to another aspect of the present disclosure, the radiation member may be made of a metal material.

According to another aspect of the present disclosure, a USB socket may be mounted onto the printed circuit board, and a terminal insertion hole corresponding to the USB socket may be formed in the outer case to expose the USB socket to outside.

According to another aspect of the present disclosure, the radiation member may be provided with an exposing portion whereby the radiation member is exposed along a rim of the terminal insertion hole such that a metal portion of the USB socket contacts the radiation member.

According to another aspect of the present disclosure a protruding portion may be formed to protrude from a surface on one end portion of the inner case.

According to another aspect of the present disclosure, an upper surface of the protruding portion may be a curved surface.

According to another aspect of the present disclosure a depositing portion may be formed to protrude on one end surface of the inner case.

According to another aspect of the present disclosure, there is provided a method for fabricating a charger with improved radiation function, the method including injection-molding the inner case after inserting the radiation member into a mold; and injection-molding the outer case after inserting into the mold a member of the radiation member and the inner case integrally formed.

According to another aspect of the present disclosure, the method may include injection-molding the inner case after inserting the radiation member into a mold; and sliding and assembling into the outer case a member of the radiation member and the inner case integrally formed.

According to another aspect of the present disclosure, the method may include injection-molding the outer case after inserting the radiation member into a mold; sliding and assembling in the inner case a member of the radiation member and the outer case integrally formed; and depositing and fixating the member of the radiation member and the inner case integrally formed with the outer case.

According to another aspect of the present disclosure, the method may include injection-molding the outer case after inserting the radiation member into a mold; and sliding and assembling into the inner case a member of the radiation member and the outer case integrally formed.

According to the present disclosure, since the heat generated from a circuit element arranged inside the charger is evenly distributed and then released outside through its surface, the surface temperature decreases. Therefore, it is possible to prevent the surface temperature of the charger from increasing excessively.

BRIEF DESCRIPTION OF THE DRAWING FIGURES

The above and/or other aspects of the present invention will be more apparent by describing certain embodiments of the present disclosure with reference to the accompanying drawings, in which.

DESCRIPTION OF THE PREFERRED EMBODIMENT

Figure 1:
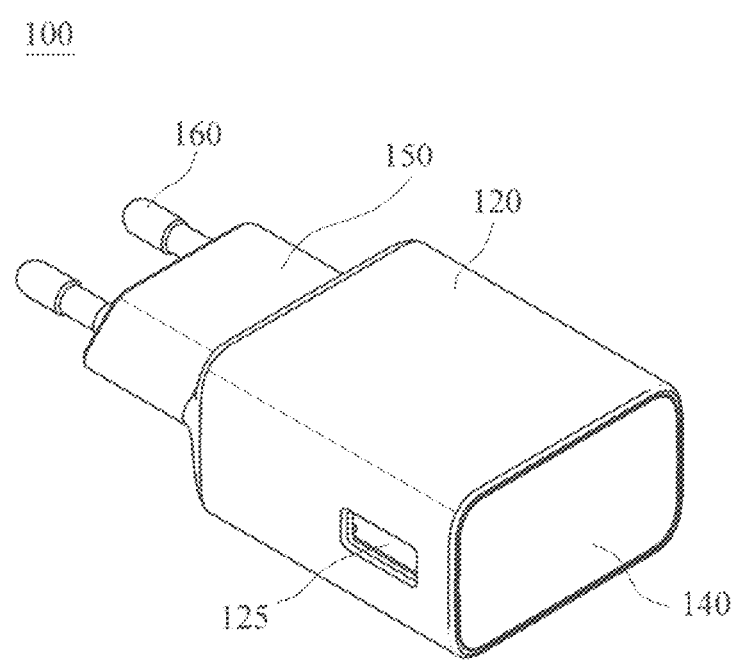
FIG. 1 is a perspective view of a charger with improved radiation function according to an embodiment of the present disclosure.

Hereinafter, various embodiments of the present disclosure will be described in detail with reference to the accompanying drawings. Further, like reference numerals or symbols disclosed in each of the drawings attached to the present specification represent parts or configurative elements performing substantially like functions. Besides the aforementioned, in cases where it is determined that a detailed explanation on a well-known function or configuration may unnecessarily obscure the gist of the present disclosure, detailed explanation thereof may be abbreviated or omitted.

Hereinafter, the present disclosure will be explained in further detail with reference to the drawings attached.

Figure 2:
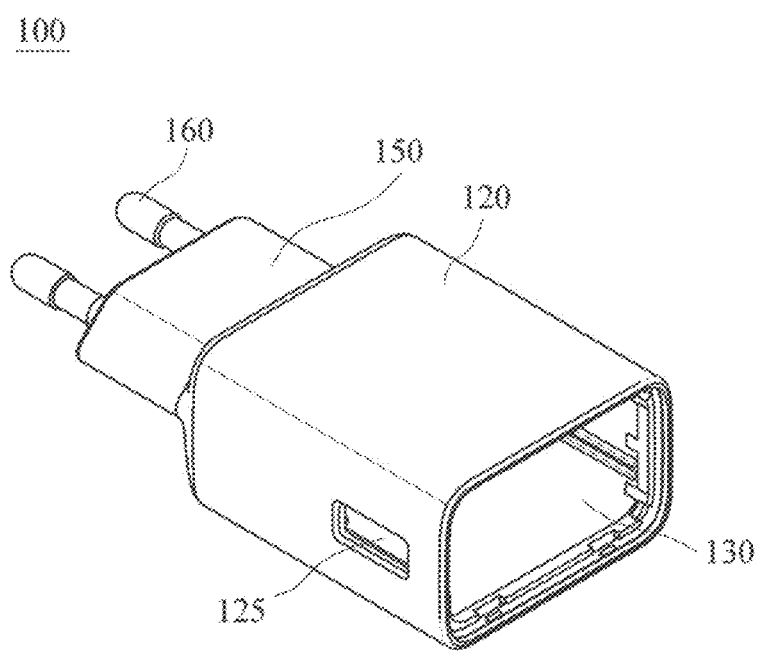
FIG. 2 illustrates the charger of FIG. 1 with its cover removed so that its inside can be seen.
Figure 3:
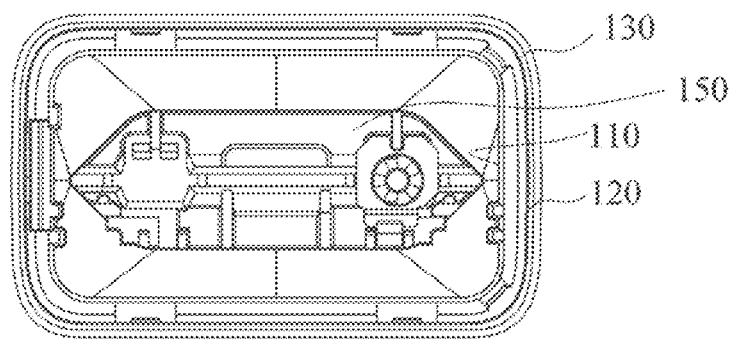
FIG. 3 illustrates the charger with its cover removed as in FIG. 2 seen from a rear side.
Figure 4:
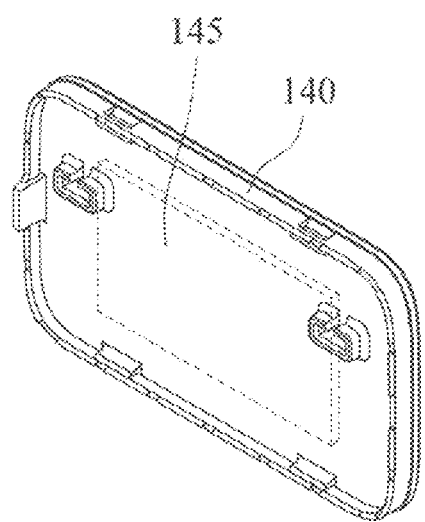
FIG. 4 is a transparent view of the cover of the charger with improved radiation function illustrated in FIG. 1.
Figure 5:
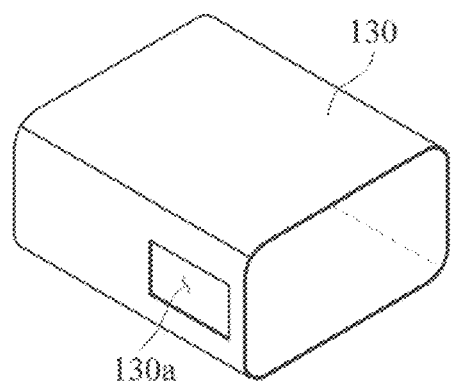
FIG. 5 is a perspective view of a radiation member of the charger with improved radiation function illustrated in FIG. 1.

FIG. 1 is a perspective view of a charger with improved radiation function according to an embodiment of the present disclosure, FIG. 2 illustrates the charger of FIG. 1 with its cover removed so that its inside can be seen, FIG. 3 illustrates the charger with its cover removed as in FIG. 2 seen from a rear side, FIG. 4 is a transparent view of the cover of the charger with improved radiation function illustrated in FIG. 1, and FIG. 5 is a perspective view of a radiation member of the charger with improved radiation function illustrated in FIG. 1.

Referring FIGS. 1 to 5, the charger 100 with improved radiation function includes a printed circuit board (not illustrated), an inner case 110, a radiation member 130, an outer case 120, a cover 140, and a terminal 160.

On the printed circuit board (not illustrated), circuit elements (not illustrated) are mounted. The circuit elements may be provided with a USB socket. The printed circuit board mounted with the circuit elements converts high-voltage electricity so that suitable voltage and current may be supplied to the mobile device to be used.

The inner case 110 is made in a hollow case form of which both surfaces are open, and the printed circuit board is arranged inside the inner case 110. The inner case 110 may be a case of which the cross-section is rectangular. The inner case 110 may be fabricated by injection-molding plastic. Meanwhile, there may be a terminal insertion hole 125 formed in the inner case 110 so that the USB terminal may be coupled to the USB socket of the printed circuit board.

Figure 6:
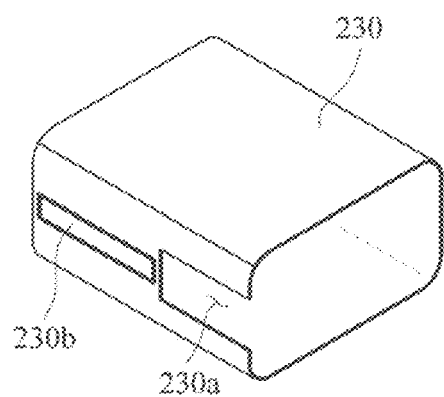
FIG. 6 is a perspective view illustrating a radiation member according to another embodiment.
Figure 7:
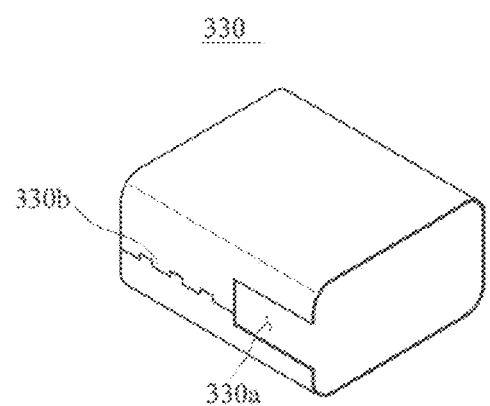
FIG. 7 is a perspective view illustrating a radiation member according to yet another embodiment.

The radiation member 130 is formed to cover an outer surface of the inner case 110, and therefore releases towards outside thereof the heat generated in the circuit elements of the printed circuit board. The radiation member 130 may have a shape corresponding to the shape of the inner case 110. That is, the shape of the radiation member 130 may vary depending on the shape of the inner case 110. As illustrated in FIGS. 5 to 7, the radiation member 130 may be fabricated in the form of a case having a rectangular cross-section. Further, on the radiation member 130, 230, 330, an incision 130a, 230a, 330a may be formed that corresponds to the terminal insertion hole 125 formed in the inner case 110.

Meanwhile, the radiation member 130 may be made of a metal material. That is, the radiation member 130 may be made of a material having good thermal conductivity such as metal. In such a case, the heat generated in the circuit elements of the printed circuit board may be transmitted to a portion of the radiation member 130, and the heat transmitted to the radiation member 130 may spread to an entirety of the radiation member 130.

Further, the radiation member 130 may be fabricated by press-molding a metal plate. Further, at one side of the radiation member 130, a joint 230b, 330b may be formed so that the radiation member 130 fabricated by press-molding may maintain its shape. The joint 144 may be one that may be bonded by welding as illustrated in FIG. 6, or may be an uneven part to be mutually coupled by fitting as illustrated in FIG. 7.

The outer case 120 is formed to encompass the radiation member 130, and is provided with one open surface. The outer case 120 may have a shape corresponding to the shape of the inner case 110 and the radiation member 130. That is, the shape of the outer case 120 may vary depending on the shape of the inner case and the radiation member 130. As illustrated, the outer case 120 may be fabricated in the form of a case having a rectangular cross-section. The outer case 120 may be fabricated by injection-molding plastic. Further, on the outer case 112a, a terminal insertion hole 125 may be formed so that the USB terminal may be coupled to the USB socket of the printed circuit board.

Meanwhile, the outer case 120 may further have an extension 150. The extension 150 is formed to extend on another surface of the outer case 120, and also such that it may be inserted into a consent (not illustrated). Therefore, the extension 150 may have a smaller size than the outer case 120. That is, the extension 150 may be formed to be stepped from the outer case 120. Of course, the extension 150 may be fabricated separately from the outer case 120.

The cover 140 is assembled in the outer case 120 to close the open one surface of the outer case 120. The cover 140 may also be fabricated by injection-molding plastic. Meanwhile, as illustrated in FIG. 4, inside the cover 140, a cover portion radiation member 145 may be arranged. In this case, the heat generated in the circuit elements arranged inside the inner case 110 may be smoothly released towards outside by the cover 140 as well.

The terminal 160 is coupled to one surface of the outer case 120, and as it is inserted into the consent, enables electricity to be supplied to the charger. The terminal 160 may also be coupled to a front end of the extension 150 of the outer case 120. Further, the terminal 160 may be provided in the plurality and be spaced apart from each other. The number and size of the terminal 160 may vary.

In a charger 100 with improved radiation function configured as aforementioned, the heat generated in the circuit elements and the like inside the charger 100 is transmitted to the radiation member 130 via the inner case 110, and is then evenly distributed to the entirety of the radiation member 130, and then released outside through the outer case 120, thereby lowering the temperature of the surface of the charger 100. Therefore, the temperature of the surface of the charger 100 is prevented from increasing excessively.

Meanwhile, the inner case 110 may be formed integrally with the radiation member 130 by insert-injection. Further, by inserting a coupling member of the radiation member 130 and the inner case 110 formed by insert-injection into a mold, and then injection-molding the outer case 120, the inner case 110, the radiation member 130, and the outer case 120 may be integrally formed. That is, the charger 100 may be fabricated by performing the insert-injection twice. Otherwise, it is possible to mold a member of the inner case 110 and the radiation member 130 coupled to each other by insert-injection, and then sliding and assemble the same into a separately fabricated outer case 120.

Further, the inner case 110 and the outer case 120 may be made of different insulating materials from each other.

Figure 8:
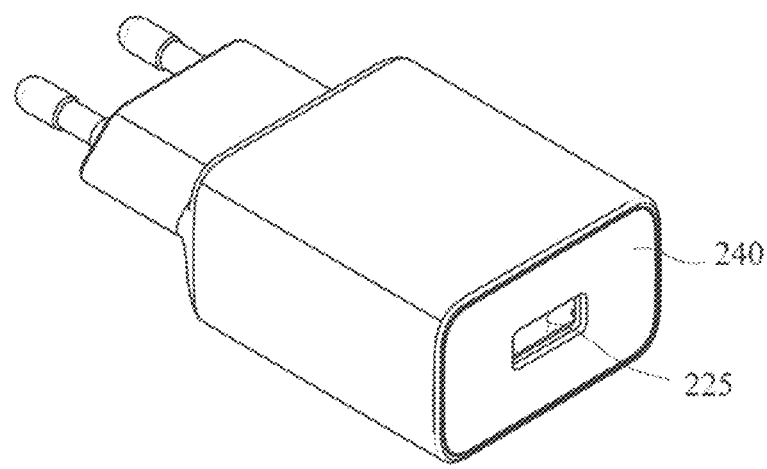
FIG. 8 is a perspective view of a charger with improved radiation function according to another embodiment.
Figure 9:
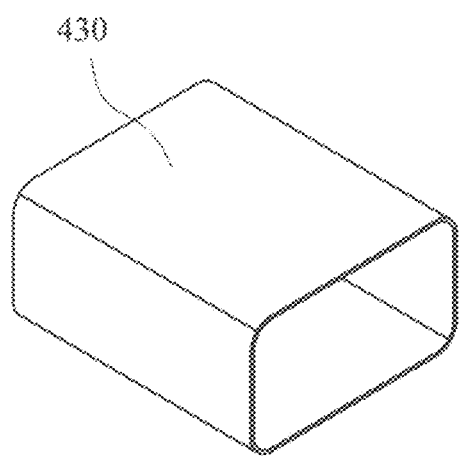
FIG. 9 is a perspective view illustrating a radiation member of the charger with improved radiation function illustrated in FIG. 8.

FIG. 8 is a perspective view of a charger 200 with improved radiation function according to another embodiment, and FIG. 9 is a perspective view illustrating the radiation member 430 of the charger 200 with improved radiation function illustrated in FIG. 8.

Referring to FIGS. 8 to 9, the terminal insertion hole 225 for exposing the USB socket towards outside may be formed on the cover 240 so that the USB terminal may be coupled to the USB socket. In this case, the radiation member 430 may be made in a rectangular hollow case form of which both surfaces are open. That is, on the radiation member 430, an incision corresponding to the terminal insertion hole 225 may be omitted. In such a case, the shape of the radiation member 430 is simplified, providing the advantage of easy fabrication process.

Figure 10:
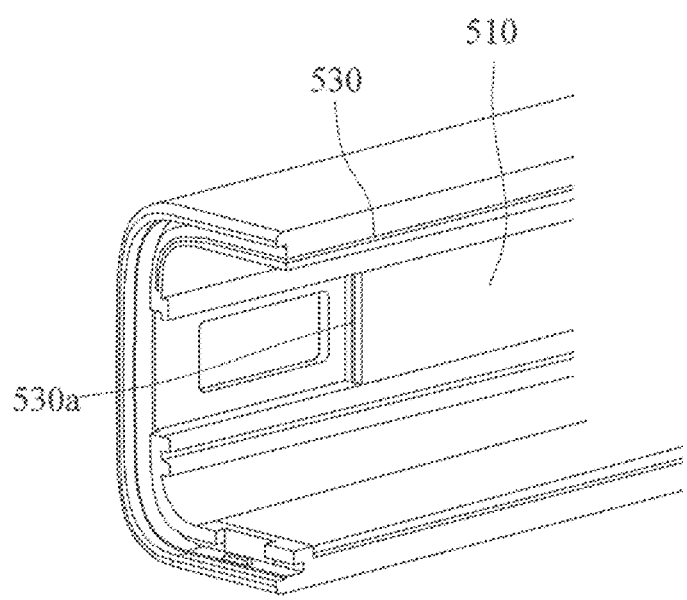
FIG. 10 is a perspective view illustrating an inner portion of the charger with improved radiation function according to another embodiment of the present disclosure.
Figure 11:
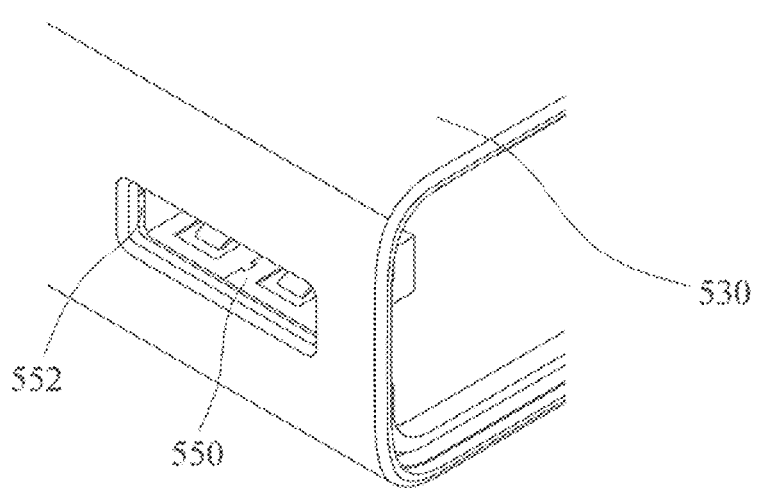
FIG. 11 is a view provided to explain a ground connection structure between the radiation member of the charger with improved radiation function of FIG. 10 and a USB socket.

FIG. 10 is a perspective view illustrating an inner portion of the charger with improved radiation function according to another embodiment of the present disclosure, and FIG. 11 is a view provided to explain a ground connection structure between the radiation member of the charger with improved radiation function of FIG. 10 and a USB socket.

Referring to FIGS. 10 to 11, the radiation member 530 may be provided with an exposing portion 530a that is exposed on a rim of the terminal insertion hole to contact a metal part 552 of the USB socket 550. That is, the exposing portion 530a may be formed to protrude further than the inner case 510. In this case, the exposure 530a contacts the metal part 552 of the USB socket 550 to form a secondary ground connecting structure.

Figure 12:
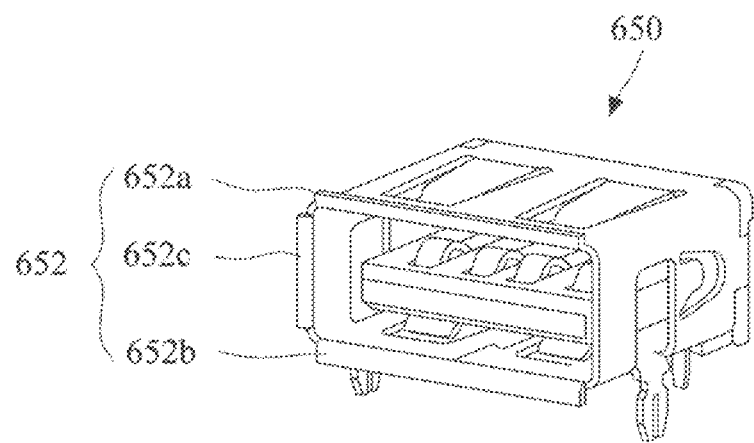
FIG. 12 is a view provided to explain a ground connection structure between the radiation member and the USB socket according to another embodiment.
Figure 12:
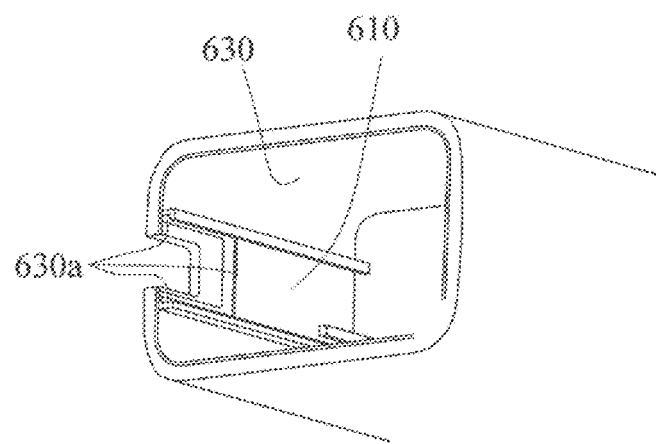

FIG. 12 is a view provided to explain the ground connecting structure between the radiation member 630 and the USB socket 650 according to another embodiment of the present disclosure.

As illustrated in FIG. 12, the exposure 630a formed to be exposed from the inner case 610 as illustrated in FIG. 12 may be formed to contact an upper and lower contact parts 652a, 652b of a distal end portion of the metal part 652 and one side contact part 652c.

Figure 13:
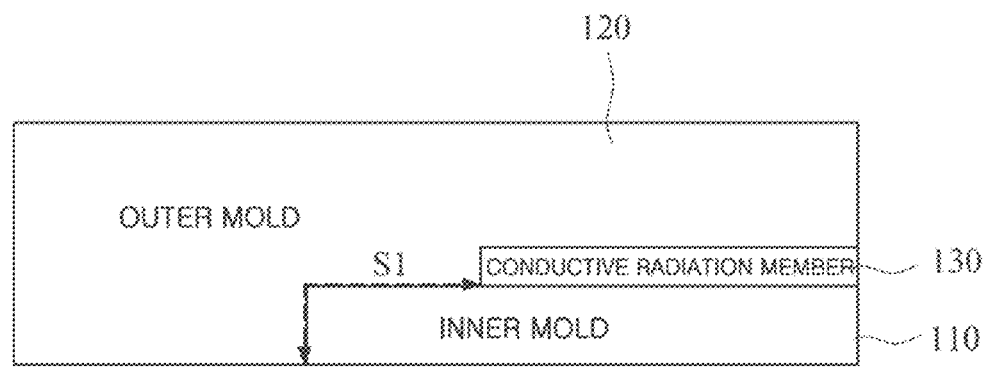
FIG. 13 is a view provided to explain an insulating distance of the radiation member provided in the charger with improved radiation function according to an embodiment of the present disclosure.
Figure 14:
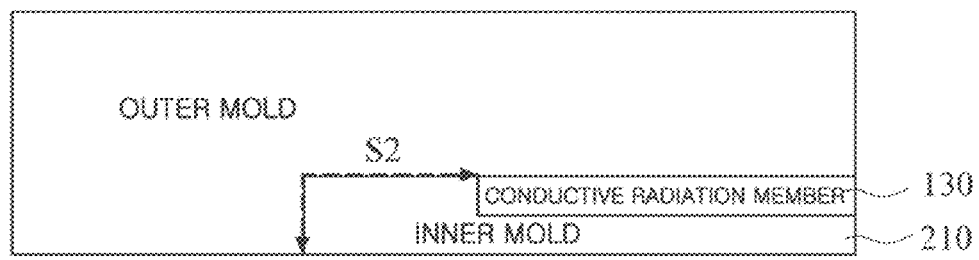
FIG. 14 is a view illustrating a first modified embodiment for increasing the insulating distance.
Figure 15:
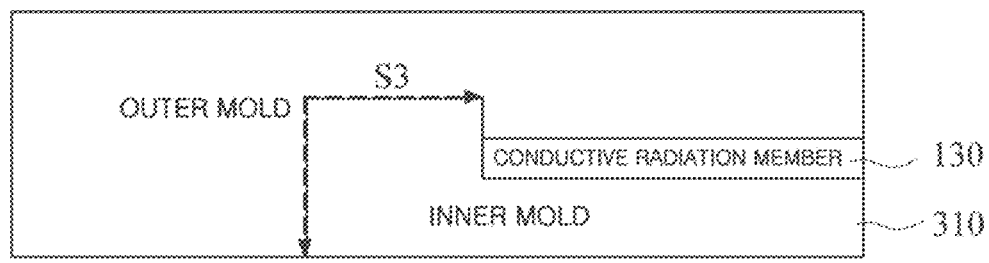
FIG. 15 is a view illustrating a second modified embodiment for increasing the insulating distance.
Figure 16:
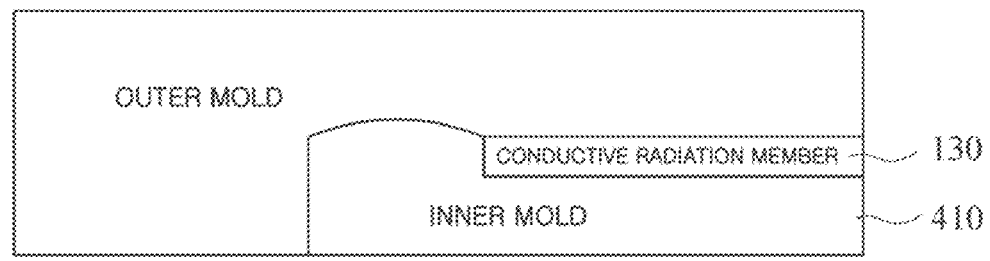
FIG. 16 is a view illustrating a third modified embodiment for increasing the insulating distance.

FIG. 13 is a view provided to explain an insulating distance of the radiation member provided in the charger with improved radiation function according to an embodiment of the present disclosure, FIG. 14 is a view illustrating a first modified embodiment for increasing the insulating distance, FIG. 15 is a view illustrating a second modified embodiment for increasing the insulating distance, and FIG. 16 is a view illustrating a third modified embodiment for increasing the insulating distance.

First of all, as illustrated in FIG. 13, the radiation member 130 is arranged between the inner case 110 and the outer case 120. Further, the radiation member 130 is coupled and installed such that it has a first insulating distance S1 shown by an arrow.

Meanwhile, as illustrated in FIGS. 14 to 15, at one end portion of the inner case 210, 310, a protruding portion may be formed to protrude from the surface. In this case, the second insulating distance S2 and third insulating distance S3 illustrated by the arrow will increase. Further, as illustrated in FIG. 16, the upper surface of the protruding portion of the inner case 410 may be a curved surface. The insulating distance increases in this case as well.

When the protruding portion is formed in the inner case 210, 310, 410, it is possible to have a first insulating distance S1 while increasing the size of the radiation member 130, and thus it is possible to further increase the radiation effect.

Figure 17:
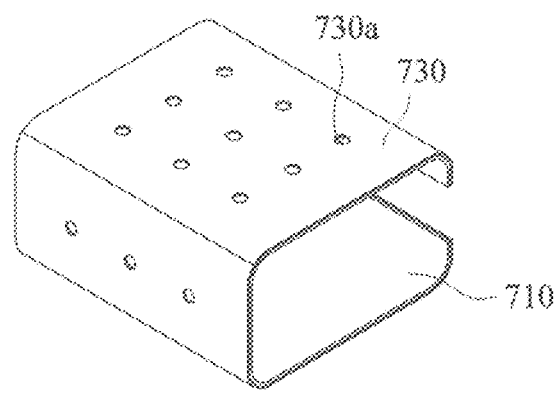
FIG. 17 is a perspective view illustrating a first modified embodiment of the radiation member and the inner case.

FIG. 17 is a perspective view illustrating a first modified embodiment of the inner case and the radiation member.

Referring to FIG. 17, on the radiation member 730, a plurality of coupling holes 730a may be formed. That is, when injection-molding the outer case later on, a plurality of projections to be coupled to this coupling holes 730a may be formed in the outer case 120. In such a case, since the inner case 710 and the outer case 120 contact each other, the bonding strength may be increased.

Figure 18:
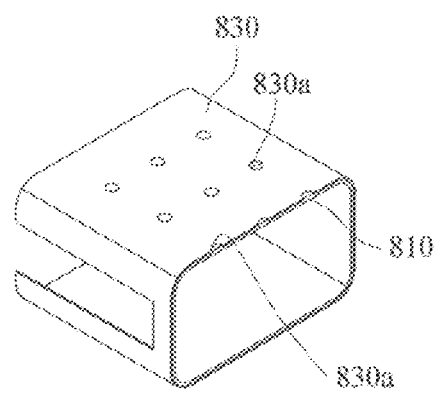
FIG. 18 is a perspective view illustrating a second modified embodiment of the radiation member and the inner case.

FIG. 18 is a perspective view illustrating a second modified embodiment of the radiation member and the inner case.

Referring to FIG. 18, the inner case 810 is charged in the plurality of coupling holes 830a of the radiation member 830. Accordingly, during the injection-molding of the outer case later on, the inner case 810 and the outer case may contact each other, and thus the bonding strength may be increased.

Figure 19:
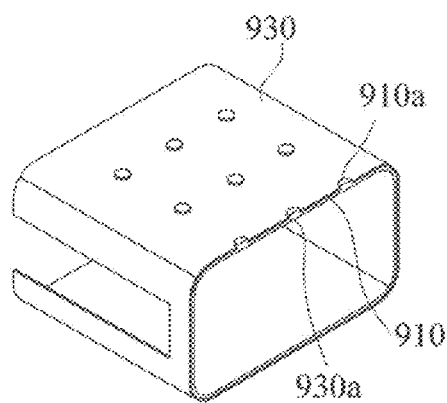
FIG. 19 is a perspective view illustrating a third modified embodiment of the radiation member and the inner case.

FIG. 19 is a perspective view illustrating a third modified embodiment of the radiation member and the inner case.

Referring to FIG. 19, the inner case 910 may be formed to penetrate the plurality of coupling holes 910a of the radiation member 930. That is, the projection 910a provided in the inner case 910 may be arranged to penetrate the coupling hole 930a of the radiation member 930. In this case, during the injection-molding of the outer case later on, the inner case 910 and the outer case will contact each other, and thus the bonding strength may be increased.

Figure 20:
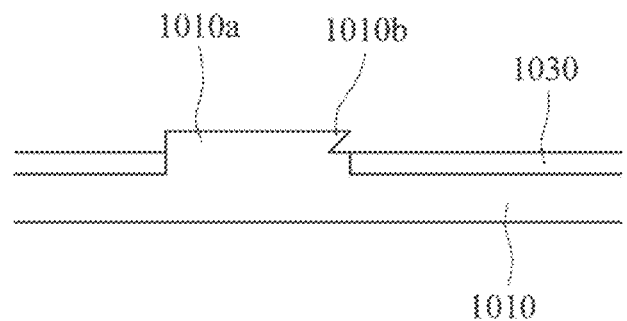
FIG. 20 is a view provided to explain a modified embodiment of a projection formed on the inner case.

FIG. 20 is a view provided to explain a modified embodiment of the projection formed in the inner case.

Referring to FIG. 20, at a distal end of the projection 1010a of the inner case 1010 being coupled to the radiation member 1030, a hook 1010b may be formed. In this case, by injection-molding the outer case later on, it is possible to make the inner case 1010 and the outer case contact each other in a crisscross manner, thereby further increasing the bonding strength between the two.

Figure 21:
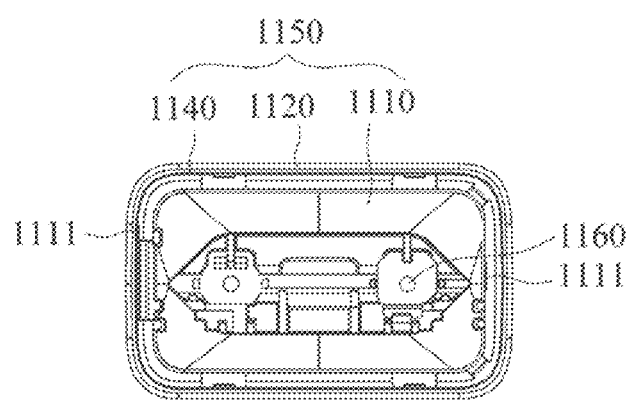
FIG. 21 is a perspective view illustrating a charger with improved radiation function according to another embodiment of the present disclosure.
Figure 22:
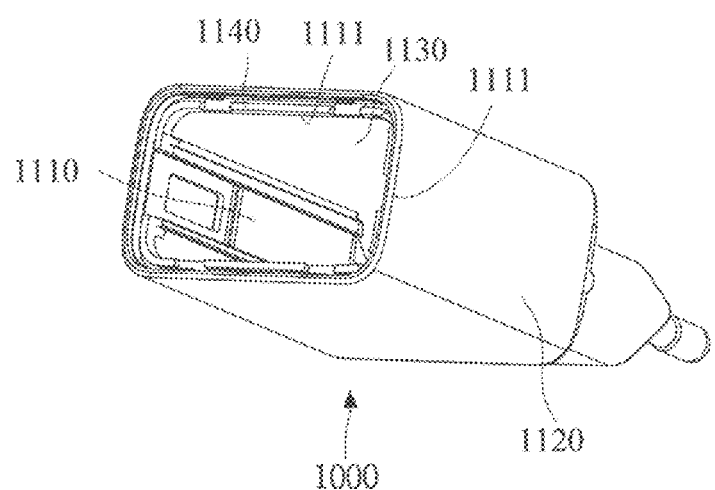
FIG. 22 is a perspective view illustrating a state where a portion of the inner case provided in the housing of the charger with improved radiation function is incised according to another embodiment of the present disclosure.

FIG. 21 is a perspective view illustrating a charger with improved radiation function according to another embodiment of the present disclosure, and FIG. 22 is a perspective view illustrating a state where a portion of the inner case provided in the housing of the charger with improved radiation function is cut according to another embodiment of the present disclosure.

Referring to FIGS. 21 and 22, the charger 1100 with improved radiation function may include a body 1150, a cover (not illustrated), a terminal 1160, and a radiation member 1130.

The terminal 1160 and the radiation member 1130 may be formed integrally with the body 1150 by insert-injection. For example, it is possible to insert the terminal 1160 and the radiation member 1130 into a mold for molding the body 1150, and then form the terminal 1160 and the radiation member 1130 integrally with the body 1150. That is, by performing an insert-injection once, it is possible to integrally form the terminal 1160 and the radiation member 1130 with the body 1150.

Meanwhile, the body 1150 may be provided with the inner case 1110 for covering the inner surface of the radiation member 1130, the outer case 1120 covering the outer surface of the radiation member 1130, and the connecting case 1140 covering the distal end surface of the radiation member 1130.

Further, a fixating hole 1111 may be formed in the body 1150 such that the radiation member 1130 and the body 1150 are integrally molded by performing the insert-injection once. That is, in order to enable the radiation member 1130 to be coupled inside the body 1150 during insert injection-molding, the injection-molding is performed with the fixating portion protruding from the injection-mold to fixate the radiation member 1130 contacting the radiation member 1130. As aforementioned, the fixating hole 1111 is formed on a portion where the radiation member 1130 and the fixating portion of the injection-mold contact each other.

By way of example, the fixating hole 1111 may be provided with a first fixating hole (not illustrated) formed in the connecting case 1140 and a second fixating hole (not illustrated) formed in the inner case 1110. The first fixating hole may be provided in the plurality as illustrated in FIG. 22. Further, the second fixating hole formed in the inner surface of the inner case 1110 may also be formed in the plurality.

Meanwhile, since the radiation member 1130 is exposed through the fixating hole 1111, an insulating distance of the inner circuitry (not illustrated) must be secured. By increasing the thickness of the inner case 1110, it is possible to secure the insulating distance. Otherwise, the insulating distance may be secured by increasing the thickness of the inner case 1110. That is, it is possible to change the position for forming the fixating hole 1111 or change the position for installing the inner circuitry so that the circuitry secures a sufficient insulating distance from the fixating hole 1111. Otherwise, it is possible to install on a portion of the inner circuitry an insulating member (for example, insulating tape) for securing the insulating distance.

Figure 23:
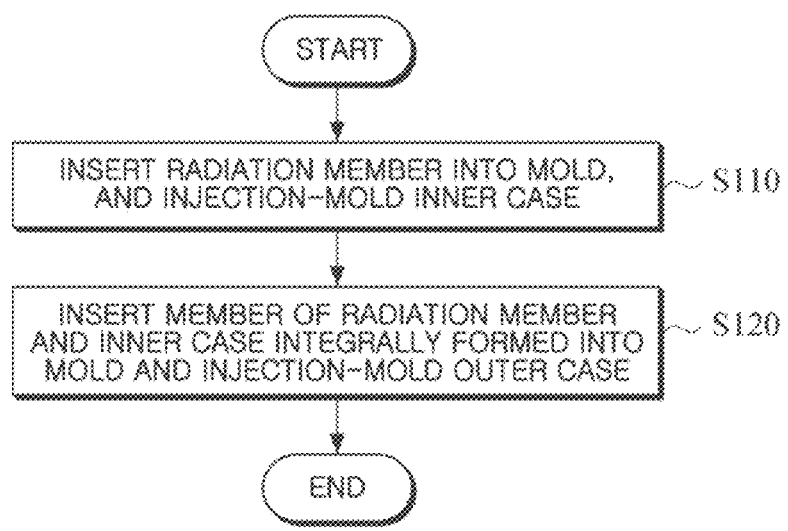
FIG. 23 is a flowchart illustrating a fabricating process of a charger with improved radiation function according to an embodiment of the present disclosure.

FIG. 23 is a flowchart illustrating a fabricating process of a charger with improved radiation function according to an embodiment of the present disclosure.

Referring to FIG. 23, the charger with improved radiation function is molded by, first of all, inserting the radiation member into a mold, and then injection-molding the inner case (S110), and inserting into the mold the member of the radiation member and the inner case integrally formed and then injecting the outer case (S120).

Figure 24:
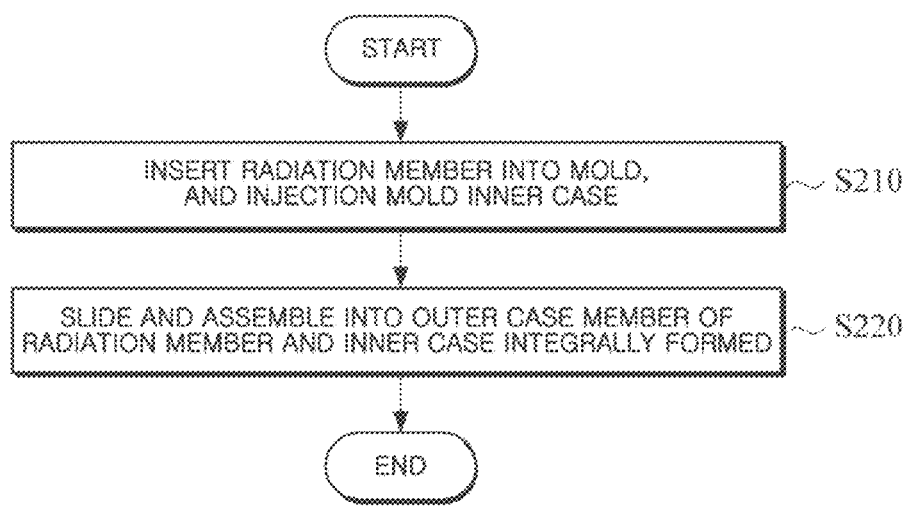
FIG. 24 is a flowchart illustrating a fabricating process of a charger with improved radiation function according to another embodiment of the present disclosure.

FIG. 24 is a flowchart illustrating a fabricating process of a charger with improved radiation function according to another embodiment of the present disclosure.

Figure 25:
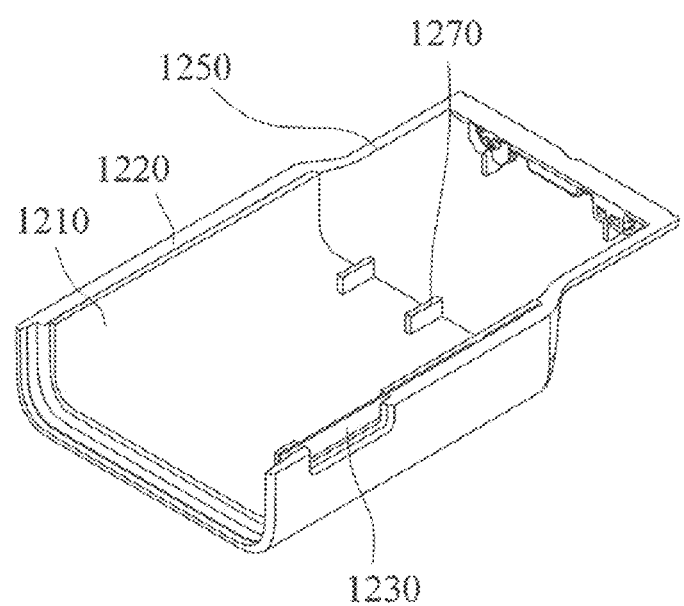
FIG. 25 is a cross-sectional view illustrating a portion of a configuration of a charger with improved radiation function according to another embodiment of the present disclosure.

Referring to FIG. 24, the charger improved with radiation function may be fabricated by, first of all, injection-molding the radiation member into the mold (S210), and then sliding and assembling the member of the radiation member and the inner case integrally formed into an outer case (S220). For this purpose, as illustrated in FIG. 25, a rib for assembly use 1270 may be formed in the outer case 1220. The rib for assembly use 1270 may be provided in the plurality on the inner surface of the outer case such that they are mutually spaced apart from each other. Into a gap formed by the rib for assembly purpose 1270 and the inner surface of the outer case 1220, the distal end of the coupling member of the inner case 1210 and the radiation member 1230 integrally formed is inserted.

Figure 26:
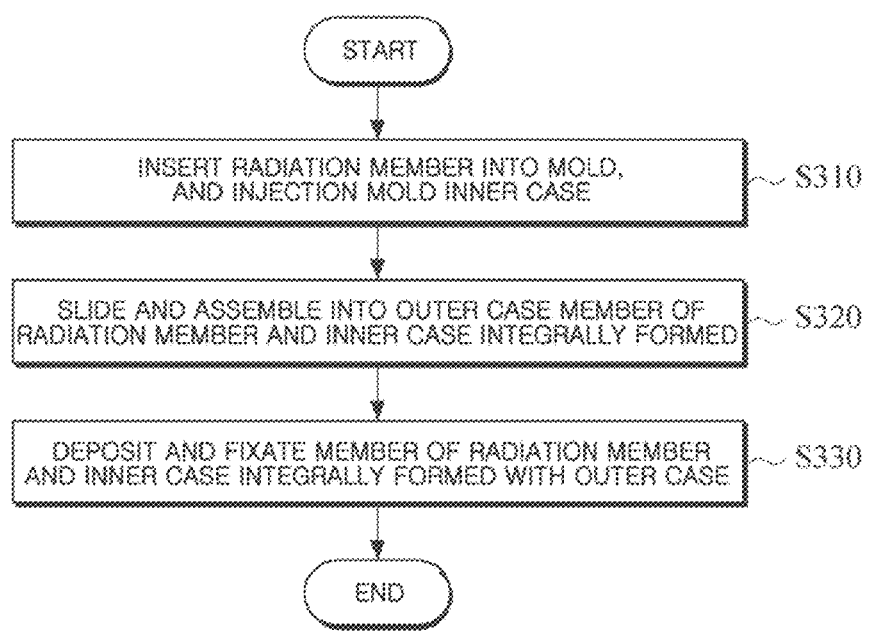
FIG. 26 is a flowchart illustrating a fabricating process of a charger with improved radiation function according to another embodiment of the present disclosure.
Figure 27:
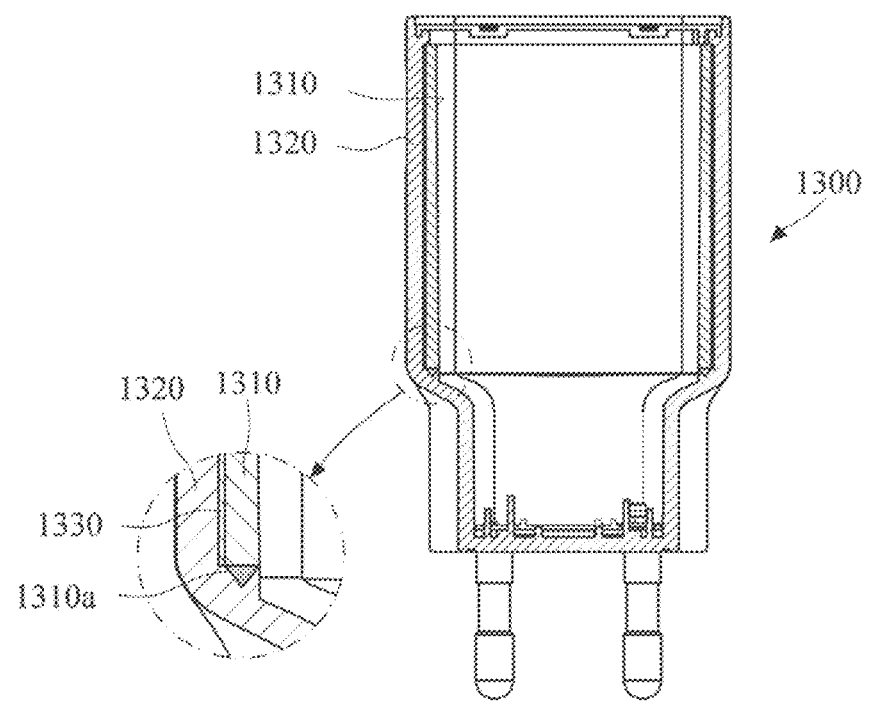
FIG. 27 is a partial cross-sectional view illustrating a charger with improved radiation function according to another embodiment.
Figure 28:
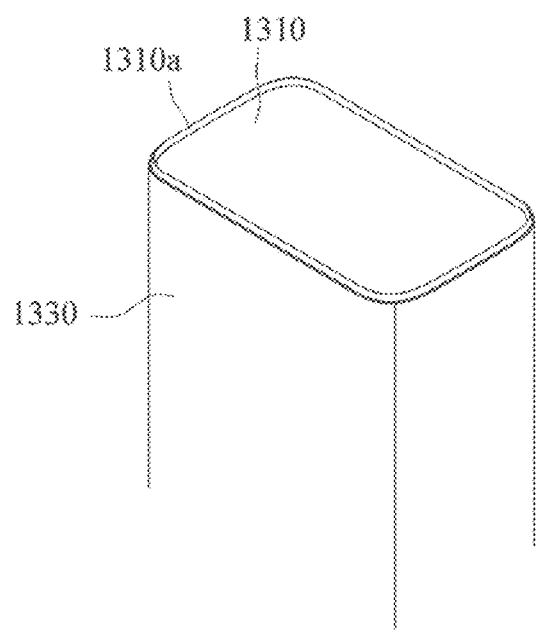
FIG. 28 is a perspective view illustrating the inner case and the radiation member according to another embodiment.
Figure 29:
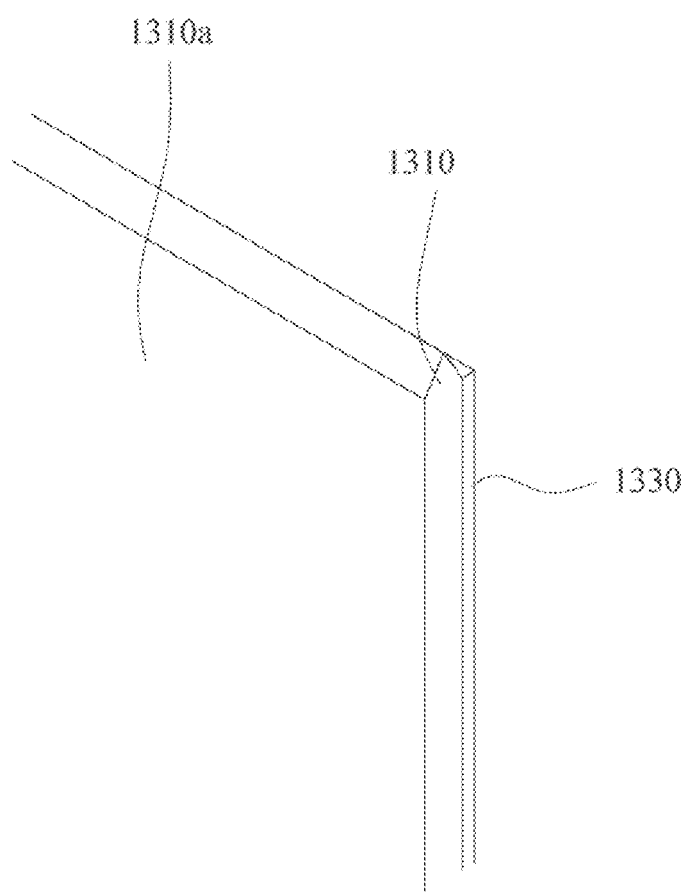
FIG. 29 is an enlarged cross-sectional view of the inner case and the radiation member illustrated in FIG. 28.

FIG. 26 is a flowchart illustrating a fabricating process of a charger with improved radiation function according to another embodiment of the present disclosure, FIG. 27 is a partial cross-sectional view illustrating a charger with improved radiation function according to another embodiment, FIG. 28 is a perspective view illustrating the inner case and the radiation member according to another embodiment, and FIG. 29 is an enlarged cross-sectional view of the inner case and the radiation member illustrated in FIG. 28.

Referring to FIGS. 26 to 29, the charger 1300 with improved radiation function may be fabricated by, first of all, inserting the radiation member 1330 into a mold, and then injection-molding the inner case 1310 (S310), and sliding and assembling the member of the radiation member 1330 and the inner case 1310 integrally formed into the outer case 1320 (S320). Then, the member of the radiation member 1330 and the inner case 1310 integrally formed and the outer case 1320 may be deposited to each other and fixated (S330). For this purpose, at one end of the inner case 1310, there may be provided a depositing portion 1310a configured to be deposited with the outer case 1320. Therefore, the depositing portion 1310a and the outer case 1320 may be bonded to each other by ultrasonic depositing.

Figure 30:
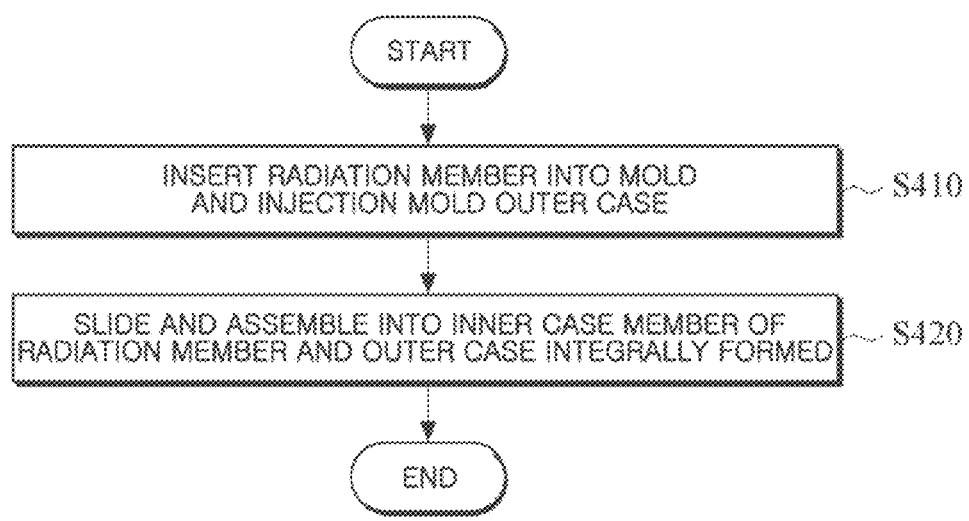
FIG. 30 is a flowchart illustrating a fabricating process of a charger with improved radiation function according to another embodiment of the present disclosure.
Figure 31:
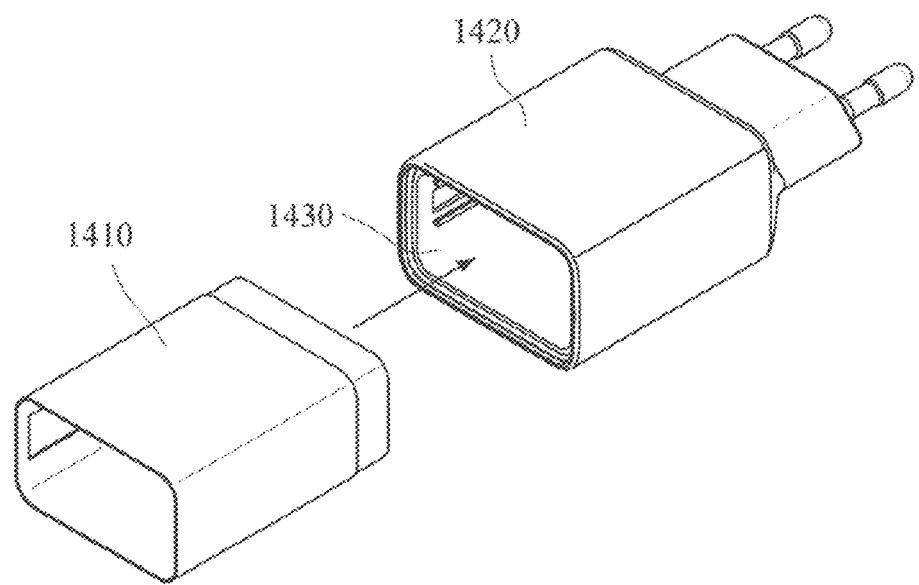
FIG. 31 is a view provided to explain a fabricating process of a charger with improved radiation function according to another embodiment of the present disclosure.

FIG. 30 is a flowchart illustrating a fabricating process of a charger with improved radiation function according to another embodiment of the present disclosure and FIG. 31 is a view provided to explain a fabricating process of a charger with improved radiation function according to another embodiment of the present disclosure.

Referring to FIGS. 30 to 31, the charger with improved radiation function may be fabricated by, first of all, inserting the radiation member 1430 into the mold, and the injection-molding the outer case 1420 (S410), and sliding and assembling the inner case 1410 into the member of the radiation member 1430 and the outer case 1420 integrally formed (S420).

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A charger with improved radiation function, the charger comprising:
a printed circuit board on which circuit elements are mounted;
an inner case formed in a hollow case shape of which both surfaces are open, and where the printed circuit board is arranged inside;
a radiation member formed to cover an outer surface of the inner case to release heat generated in the circuit elements of the printed circuit board;
an outer case formed to encompass the radiation member, and provided with one open surface;
a cover assembled in the outer case, and configured to close the one open surface of the outer case; and
a terminal coupled to one surface of the outer case, and configured to enable electricity to be supplied to the charger when inserted into a consent,
wherein a plurality of coupling holes are formed on at least one surface of the radiation member, and a plurality of projections to be coupled to the coupling holes are formed on one of the inner case and the outer case, and wherein each of the plurality of projections passes the coupling hole and protrudes towards outside of the radiation member, and a hook is formed at a distal end of each of the projections.

2. The charger according to claim 1, wherein the inner case and the outer case are made of different insulating materials from each other.

3. The charger according to claim 1, wherein a cover portion radiation member is arranged inside the cover.

4. The charger according to claim 1, wherein the radiation member is integrally formed with at least one of the inner case and the outer case.

5. The charger according to claim 1, wherein a USB socket is mounted onto the printed circuit board, and a terminal insertion hole corresponding to the USB socket is formed in the outer case to expose the USB socket to outside.

6. The charger according to claim 5, wherein the radiation member is provided with an exposing portion whereby the radiation member is exposed along a rim of the terminal insertion hole such that a metal portion of the USB socket contacts the radiation member.

7. The charger according to claim 1, wherein a USB socket is mounted onto the printed circuit board, and a terminal insertion hole corresponding to the USB socket is formed in the cover to expose the USB socket to outside.

8. The charger according to claim 7, wherein the radiation member is provided with an exposing portion whereby the radiation member is exposed along a rim of the terminal insertion hole such that a metal portion of the USB socket contacts the radiation member.

9. The charger according to claim 1, wherein, on one end portion of the inner case, a protruding portion is formed to protrude from a surface on one end portion of the inner case.

10. The charger according to claim 9, wherein an upper surface of the protruding portion is a curved surface.

11. The charger according to claim 1, wherein a depositing portion is formed to protrude on one end surface of the inner case.

12. The charger according to claim 1, wherein a joint is consisted of an uneven portion at one side surface of the radiation member.

13. A method for fabricating a charger with improved radiation function comprising an inner case formed in a hollow case shape of which both surfaces are open, a radiation member formed to cover an outer surface of the inner case to release heat, and an outer case formed to encompass the radiation member and provided with one open surface, the method comprising:
injection-molding the inner case after inserting the radiation member into a mold; and
injection-molding the outer case after inserting into the mold a member of the radiation member and the inner case integrally formed,
wherein a plurality of coupling holes are formed on at least one surface of the radiation member, and a plurality of projections to be coupled to the coupling holes are formed on one of the inner case and the outer case, and wherein each of the plurality of projections passes the coupling hole and protrudes towards outside of the radiation member, and a hook is formed at a distal end of each of the projections.

14. A method for fabricating a charger with improved radiation function comprising an inner case formed in a hollow case shape of which both surfaces are open, a radiation member formed to cover an outer surface of the inner case to release heat, and an outer case formed to encompass the radiation member and provided with one open surface, the method comprising:

inserting the radiation member into a mold, and then injection-molding the inner case; and sliding and assembling into the outer case a member of the radiation member and the inner case integrally formed, wherein a plurality of coupling holes are formed on at least one surface of the radiation member, and a plurality of projections to be coupled to the coupling holes are formed on one of the inner case and the outer case, and wherein each of the plurality of projections passes the coupling hole and protrudes towards outside of the radiation member, and a hook is formed at a distal end of each of the projections.

* * * * *